Patented May 14, 1929.

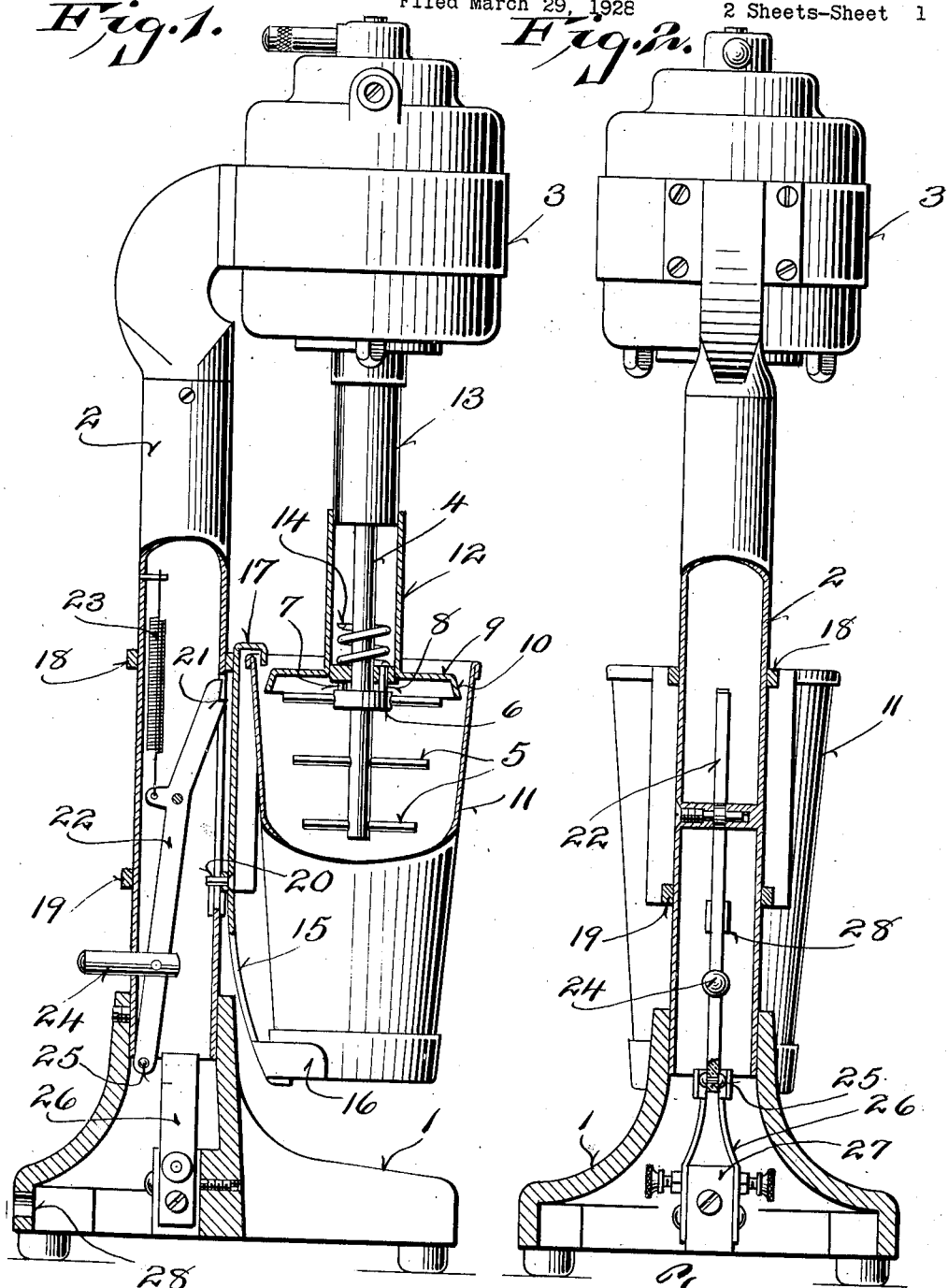

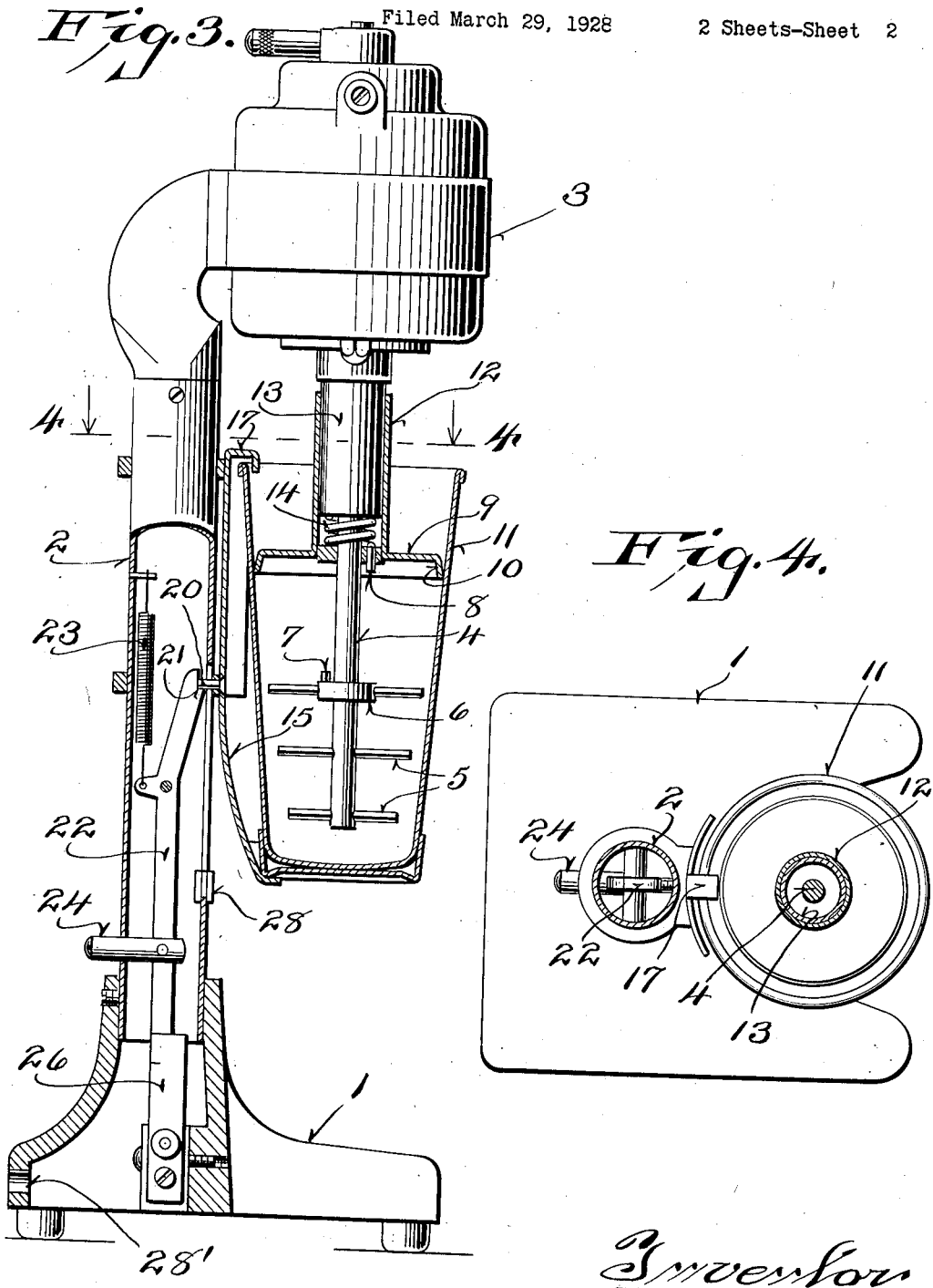

1,713,119

UNITED STATES PATENT OFFICE.

HARRISON D. FLEGEL, OF RACINE, WISCONSIN.

DRINK MIXER.

Application filed March 29, 1928. Serial No. 265,725.

This invention relates to mixers, and is particularly directed to a drink mixer.

Objects of this invention are to provide a novel form of drink mixer which is so constructed that the maximum speed of mixing may be obtained without any danger of throwing the contents of the container outwardly by centrifugal action.

In mixers as heretofore constructed, the time required for effecting the mixing has been definitely limited by the speed at which the contents of the container could be rotated, as the contents would creep upwardly over the top edge of the container due to the action of centrifugal force.

This invention overcomes the defects heretofore encountered in drink mixers and provides means whereby a very much higher speed of mixing may be obtained, as a shield is provided and cooperates with the drink mixer in a novel manner to seal the container, irrespective of its exact shape or size, and to thus prevent the throwing of the drink outwardly during this rapid mixing operation.

Further objects are to provide a drink mixer of the character described above in which yielding means are provided for holding the shield yieldingly in contact with the container, thus accommodating containers of different sizes, and to further provide means for giving the shield-like member a quick rotative movement when the container is lowered, and before it is removed, so as to free the shield-like member of any adhering particles of the drink, and depositing these adhering particles within the container.

Further objects of this invention are to provide a novel form of drink mixer in which an agitator having a plurality of agitating members arranged at spaced intervals and driven by a high speed electric motor may be employed without danger of spilling any of the contents of the container during mixing, and to incorporate within this drink mixer a novel form of latching switch which may be temporarily manually held closed during lowering of the container, so that the motor continues to operate and thus throws all adhering particles of the drink both from the agitator and from the shield before the container is removed.

An embodiment of the invention is shown in the accompanying drawings in which:

Figure 1 is a side elevation of the drink mixer with parts broken away and in section;

Figure 2 is a rear view partly in section;

Figure 3 is a side elevation corresponding to Figure 1, but showing the parts in a different position;

Figure 4 is a sectional view on the line 4—4 of Figure 3.

Referring to the drawings, it will be seen that the device comprises a base 1 from which rises a tubular or hollow standard 2. The upper portion of the standard supports a high speed electric motor 3 which is provided with a downwardly projecting shaft 4 equipped with a plurality of agitators 5. The uppermost of these agitators may carry a collar 6 provided with an upwardly projecting pin 7, as shown most clearly in Figure 3.

This upwardly projecting pin cooperates with a downwardly projecting pin 8 carried by a disc-like shield member 9. This disc-like shield member is provided with a bevelled downwardly projecting outer flange 10 adapted to engage the inner walls of the container 11, and to thus completely shield the container when the container is elevated. The shield member is also provided with a sleeve 12 which slidably fits upon an elongated bearing 13 carried by the motor and projecting downwardly.

Further, it is to be noted that a short, helical spring 14 is positioned within the sleeve and is adapted to contact with the lower end of the bearing 13 when the container is moved into elevated position, as shown in Figure 3. When this position is occupied by the parts, it will be seen that the disc-like shield plate or member seals the container and also that it is yieldingly urged downwardly as the spring 14 is then under compression, as shown in Figure 3. When the container is lowered, it is to be noted that the shield-like member drops down and that the pin 8 carried thereby contacts with the pin 7 rigidly associated with the motor shaft 4 and preferably carried by the uppermost of the agitators. This causes a rapid rotation of the shield-like member and thus throws all adhering particles therefrom, such particles being caught by the container for the container then occupies the position illustrated in Figure 1.

A support 15 is provided for the container and this support may consist of a bottom portion 16 and an upper hook-like portion 17. The support is slidably carried upon the standard 2 by means of the pair of spaced rings 18 and 19. One of the rings, for instance, the ring 19, is provided with a projecting pin 20. The pin is adapted to seat in a notch 21 of a pivoted lever 22, mounted within the standard, when the container is elevated, as shown in Figure 3, and to thus retain the container temporarily in elevated position. A spring 23 is employed for urging the lever towards latching position. The lever is unlatched by means of a manually operable plunger 24 slidably projecting through the standard 2 and pivoted to the lever, as shown in Figures 1 and 3.

The lever is preferably formed from insulating material and its lower end carries a rivet 25 which is headed on each end and which is adapted to rock between the opposite faces of a pair of stationary spring contacts 26, these spring contacts being carried by an insulating block 27 mounted within the hollow portion of the standard or the hollow portion of the base as desired. This switch, of course, is connected in the motor circuit although for the sake of clearness of illustration, the conductors have been omitted. Obviously, the conductors may lead from the device at any suitable point, for instance, through the opening 28' provided in the base.

When the device is not in use, the parts are in the position shown in Figure 1. When it is desired to use the device, the container with the drink therein is positioned as shown in Figure 1, and is shoved upwardly into the position shown in Figure 3. This causes a wedging action to occur between the flange of the shield plate and the inner surface of the container, and also moves the shield plate upwardly and compresses the spring 14, as described previously. The mixing can, therefore, take place with the utmost rapidity, for the shield plate prevents any of the mixture from escaping upwardly over the top of the container. By means of this construction, it is possible to employ a higher powered motor and operate the motor at a higher rate of speed than has heretofore been found possible with the ordinary types of drink mixers. Thus, it is apparent that the mixing may take place in a few seconds so that the machine is available for almost constant use with scarcely any interval required for the mixing of a single drink.

It is to be noted that the switch also has a releasing latching means manually operable. When the latching means is released, the switch remains closed as the spring arms or stationary contact arms 26 are relatively wide and the movable contact does not pass therefrom, even when the latch is released by means of the plunger 24. Thus, when the container is lowered, the shield plate is given a quick rotation which throws adhering particles therefrom and thus thoroughly cleans the shield plate as well as the agitator.

It is apparent therefore, that the utmost speed may be secured by this type of apparatus.

It is apparent that many modifications may be made in this invention without departing from the spirit thereof. For instance, various cushioning devices may be employed so that the operator does not have to be particularly careful in operating the container. For example, a rubber cushion 28 may be employed, as shown in Figure 3, against which the pin 20 can strike when the container is lowered.

Other modifications obviously may be made without departing from the spirit of the invention and therefore it is to be understood that the description and drawings are to be interpreted as illustrative as the invention is to be determined as defined in the appended claims.

I claim:

1. A drink mixer including a rotatable shaft, a plurality of agitators carried thereby, a shield supported on the shaft, a container adapted to be moved into contact with said shield and receive the agitators, means for rotating the shaft when the shield is engaged with the container and means whereby to impart a rotative movement to the shield when disengaged from the container and prior to the removal of the agitators from the container.

2. A drink mixer comprising an electric motor having a downwardly projecting elongated bearing, a shaft projecting through said bearing and provided with an agitator, a disc-like shield member having a sleeve slidably mounted upon said elongated bearing, a spring loosely surrounding a portion of said shaft and adapted to contact with the bottom of said elongated bearing when said shield is elevated, a container adapted to receive said agitator and to be moved upwardly thereby compressing said spring and causing said shield-like member to seal the container, and supporting means for temporarily holding said container in an elevated position.

3. A drink mixer comprising an electric motor having a downwardly projecting elongated bearing, a shaft projecting through said bearing and provided with an agitator, a disc-like shield member having a sleeve slidably mounted upon said elongated bearing, a spring loosely surrounding a portion of said shield member and adapted to contact with the bottom of said elongated bearing when said shield is elevated, a container adapted to receive said agitator and to be moved upwardly, thereby compressing said spring and causing said shield-like member to seal the container, and supporting means for temporarily holding said container in an elevated position, said supporting means controlling a switch for said electric motor, and manually operable means for releasing said support and permitting the removal of said container.

4. A drink mixer comprising an electric motor having a downwardly projecting elongated bearing, a shaft projecting through said bearing and provided with an agitator, a disc-like shield member having a sleeve slidably mounted upon said elongated bearing, a spring loosely surrounding a portion of said shield member and adapted to contact with the bottom of said elongated bearing when said shield is elevated, a container adapted to receive said agitator and to be moved upwardly thereby compressing said spring and causing said shield-like member to seal the container, and supporting means for temporarily holding said container in an elevated position, said supporting means controlling a switch for said electric motor, and manually operable means for releasing said support and permitting the removal of said container, and means for rotating said shield when said container is in its lower position.

5. A mixer comprising an upright standard having a base portion, a switch carried within said standard and consisting of a pair of stationary blades and a movable lever having a movable contact, an electric motor controlled by said switch and carried by said standard, an agitator driven by said electric motor, a container adapted to be moved upwardly into position below said motor, said lever having latching means for temporarily holding said container elevated, a manually operable plunger for releasing said latching means and for holding said switch temporarily closed, a shield-like member mounted adjacent said motor and slidably and revolubly carried, and means for temporarily connecting said agitator and said shield-like member when said container is lowered, whereby said shield-like member may be rotated while positioned within said container.

In testimony that I claim the foregoing I have hereunto set my hand at Racine, in the county of Racine and State of Wisconsin.

HARRISON D. FLEGEL.